(12) United States Patent
Hecht (10) Patent No.: US 6,323,503 B1
(45) Date of Patent: *Nov. 27, 2001

(54) CCD SCANNER HAVING IMPROVED SPECULAR REFLECTION DISCRIMINATION

(75) Inventor: Kurt Hecht, Hartsville, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,944

(22) Filed: May 28, 1999

Related U.S. Application Data (63) Continuation-in-part of application No. 08/790,956, filed on Jan. 29, 1997, now Pat. No. 5,942,762.

(51) Int. Cl.$^7$ .................................................. G06K 7/10
(52) U.S. Cl. ................... 250/566; 250/235; 250/216
(58) Field of Search .......................... 250/566, 556, 250/235, 559.44, 216, 208.1, 226, 227.23; 235/462.37, 462.35, 462.32, 462.24; 386/346, 349; 382/312, 313

(56) References Cited

U.S. PATENT DOCUMENTS

| | | | |
|---|---|---|---|
| 3,808,447 | 4/1974 | Leavens, Jr. .................. | 250/569 |
| 4,782,219 | 11/1988 | Crater ............................. | 250/566 |
| 5,149,948 | 9/1992 | Chisholm ....................... | 235/462 |
| 5,233,171 | * 8/1993 | Baldwin ......................... | 235/467 |
| 5,239,169 | 8/1993 | Thomas ......................... | 235/462 |
| 5,406,060 | 4/1995 | Gitin .............................. | 235/462 |
| 5,442,438 | 8/1995 | Batchelder et al. ........... | 356/301 |
| 5,449,892 | 9/1995 | Yamada ......................... | 235/462 |
| 5,541,419 | 7/1996 | Arackellian ................... | 250/566 |
| 5,942,762 | * 8/1999 | Hecht ............................. | 250/556 |

FOREIGN PATENT DOCUMENTS

| | | |
|---|---|---|
| 19510257A1 | 9/1995 | (DE) . |
| 0378198A2 | 7/1990 | (EP) . |
| 0690404A2 | 1/1996 | (EP) . |
| 2102610A | 2/1983 | (GB) . |

OTHER PUBLICATIONS

Patent Abstracts of Japan, vol. 011, No. 032 (P–541), Jan. 30, 1987, and JP 61 201381 A (Ricoh Co. Ltd.), Sep. 6, 1986, see abstract.

* cited by examiner

*Primary Examiner*—Que T. Le (57) ABSTRACT

An optical scanner utilizes two linear CCD detectors and a bandpass means to improve the ability of the scanner to discriminate against specular reflection. A coded symbology is illuminated by a noncoherent light source and light reflected from the coded symbology along a first path strikes the front face of the bandpass means. The bandpass means, functioning as a notch filter, transmits a select bandwidth of light while reflecting all other light onto a first CCD detector. Simultaneously, light reflected from the bar code symbol travels along a second path, at a different angle with respect to the plane of the coded symbology than the first path, is reflected from a mirror onto the back face of the bandpass means. The bandpass means transmits the select bandwidth of light onto a second CCD detector and reflects all other light. The second CCD detector has a notch filter which permits the detection of only the select bandwidth. Since specular reflection is only experienced at a single angle, with respect to the plane of the coded symbology and each CCD detector detects an image at a different angle with respect to the plane of the coded symbology, a complete image can be reconstructed by combining information obtained from both CCD detectors.

23 Claims, 7 Drawing Sheets

CCD SCANNER HAVING IMPROVED SPECULAR REFLECTION DISCRIMINATION

This application is a continuation-in-part of U.S. patent application Ser. No. 08/790,956, now U.S. Pat. No. 5,942,762 filed Jan. 29, 1997.

BACKGROUND OF THE INVENTION

1. Field of the Invention

The present invention relates generally to optical scanning systems. More particularly, this invention relates to a system and method capable of imaging targets in the presence of specular reflection.

2. Description of Related Art

Coded symbologies are being used in an increasingly diverse array of applications. The ability to track a large amount of items quickly and efficiently has led coded symbologies to be used in applications such as retail checkout, warehousing, inventory control and document tracking. As the volume of items tracked by coded symbologies has increased, the need for optical scanners which operate at high speeds has likewise increased.

Various optical scanning systems have been developed for reading and decoding coded symbologies. Scanning systems include optical laser scanners and optical charge-coupled device (CCD) scanners. Optical laser scanners generally employ a laser diode, a multifaceted polygonal mirror, focusing optics and a detector. The scanning rate of an optical laser scanner is limited by the number of facets on the mirror and the available motor speed.

CCD scanners may incorporate a non-laser light source and a CCD light detecting means, such as a CCD linear sensor. A portion of the light which is reflected from the coded symbology is detected by the CCD linear sensor and converted into an electrical signal which is the basis for a digital image of the coded symbology that has been scanned. The digital image is then processed and decoded according to the specific type of coded symbology.

One disadvantage with current CCD scanners is that they are susceptible to specular reflection which saturates areas of the CCD linear sensor and prohibits the detection of a portion of the optically coded information. This is particularly a problem when the coded symbology is printed under a highly reflective surface, such as a plastic coating.

Specular reflection is only a problem at a single angle, known as the "critical angle", between the light source, the reflective surface and the CCD linear sensor. Current methods of coping with specular reflection include placing separate scanners at different angles with respect to the surface. However, providing duplicate CCD scanners for this purpose is extremely expensive. Techniques involving light polarizers have also been used. However, due to the light losses introduced by the materials used to make light polarizers, they are extremely inefficient.

Accordingly, there exists a need for an efficient and inexpensive scanning system with the speed of a CCD scanner that can accurately read and decode coded symbologies in the presence of specular reflection.

SUMMARY OF THE INVENTION

The present invention utilizes two CCD linear sensors and a bandpass means to improve the ability of an optical scanner to discriminate against specular reflection. A coded symbology is illuminated by a noncoherent light source and light reflected from the coded symbology travels along a first path and strikes the front face of the bandpass means. The bandpass means, functioning as a notch filter, transmits a select bandwidth of light while reflecting all other light onto a first CCD linear sensor. Simultaneously, light reflected from the bar code symbol travels along a second path, at a different angle with respect to the plane of the coded symbology than the first path, and is reflected from a mirror onto the back face of the bandpass means. The bandpass means transmits the select bandwidth of light onto a second CCD linear sensor and reflects all other light. The CCD linear sensors each have a notch filter which permits the detection of only a select bandwidth. Since specular reflection is only experienced at a single angle with respect to the plane of the coded symbology, and each CCD linear sensor detects an image at a different angle with respect to the plane of the coded symbology; a complete image of the coded symbology is obtained by one or both of the CCD linear sensors, or can be reconstructed by combining information obtained from both CCD linear sensors.

Accordingly, it is an object of the invention to provide a CCD scanner which can read and decode coded symbologies in the presence of specular reflection.

Other objects and advantages will become apparent to those skilled in the art after reading the detailed description of a presently preferred embodiment.

DETAILED DESCRIPTION OF THE PREFERRED EMBODIMENT

Figure 1:
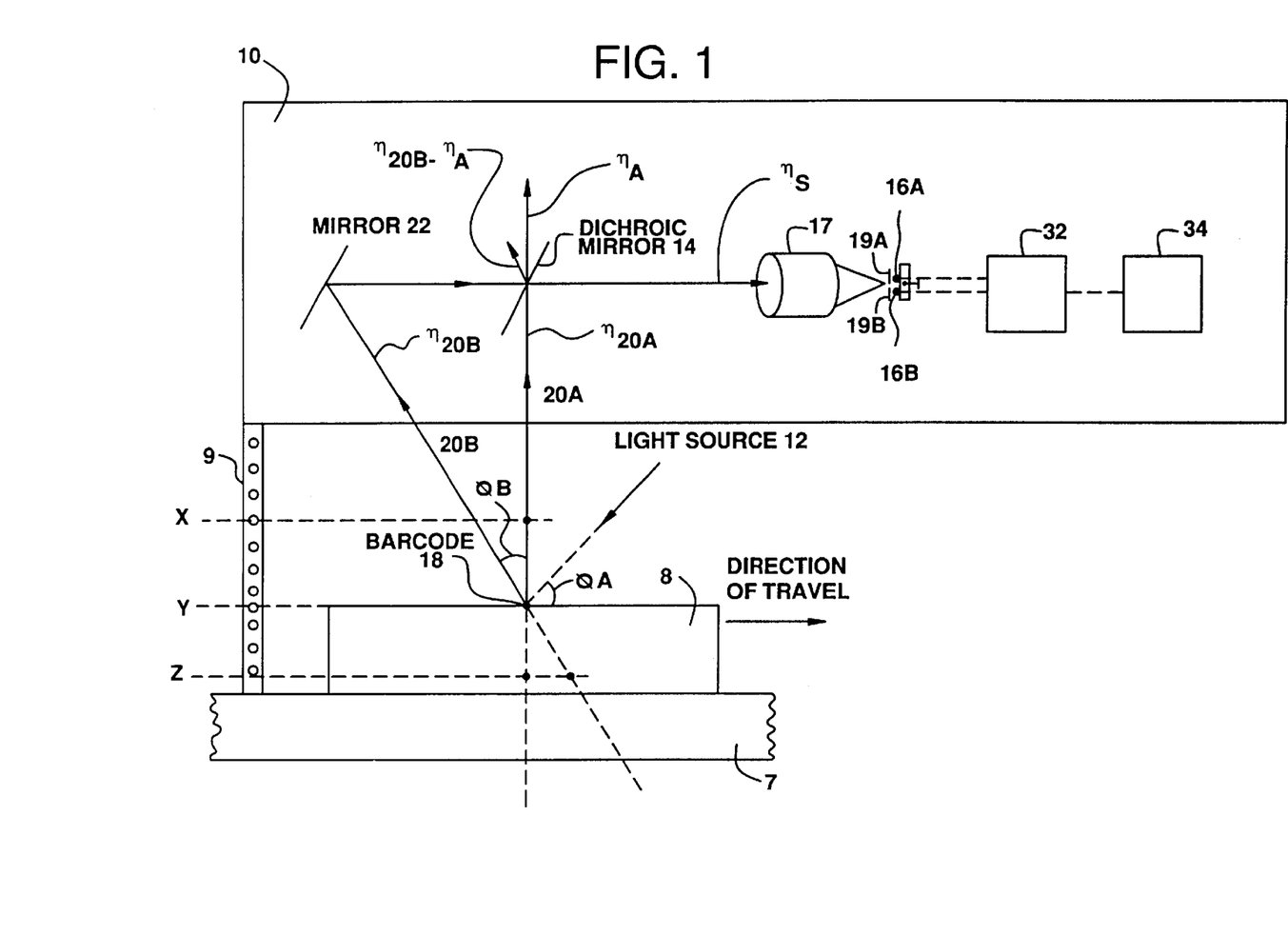
FIG. 1 is a coded symbology scanning system made in accordance with the present invention.

The preferred embodiment will be described with reference to the drawing figures wherein like numerals represent like elements throughout. Referring to FIG. 1, a coded symbology scanning system 10 made in accordance with the present invention is shown. The coded symbology scanning system 10 is able to scan any type of coded symbology. However, for simplicity, reference hereinafter will be made to a particular type of coded symbology, i.e. a bar code symbol. The scanning system 10 includes a non-coherent light source 12, a bandpass means 14, a planar mirror 22, focusing optics 17, two CCD linear sensors 16A and 16B, two filters 19A and 19B, a logic unit 32 and an output means 34.

The light source 12 facilitates detection of a subject bar code symbol 18 by illuminating the bar code symbol 18 located on a package 8 or other object. Preferably, the package 8 is supported by a moving conveyor belt 7. The planar mirror 22 and the bandpass means 14 are aligned such that light reflected from the bar code symbol 18 along a first path 20A strikes the front of the bandpass means 14, while light traveling along a second path 20B reflects off the planar mirror 22 and strikes the rear of the bandpass means 14. It should be recognized by those skilled in the art that FIG. 1 is illustrative only and is not drawn to scale. For example, the angle $\theta_A$ between the light source 12 and the bar code symbol 18 is typically 77°. The angle $\theta_B$ between the first path 20A and the second path 20B is approximately 3–5°. However, it should be recognized by those skilled in the art that these angles are approximate and may vary widely depending upon the specific application and the mounting of the system 10 in relation to the bar code 18.

The bandpass means 14 permits light of predetermined wavelengths around $\eta_A$, striking either its front or rear surface, to pass through the bandpass means 14, and reflects the remainder of the light spectrum. The spectrum of light $\eta_{20A}$ traveling along the first path 20A strikes the front of the bandpass means 14. Light having wavelengths around $\eta_A$ passes through the bandpass means 14, while the remainder of the spectrum of light $\eta_{20A}-\eta_A\pm$ is reflected toward the CCD detectors 16A, 16B. The spectrum of light $\eta_{20B}$ traveling along the second path 20B is reflected off the planar mirror 22 and strikes the back of the bandpass means 14. Light having wavelengths around $\eta_A$ passes through the bandpass means 14 toward the CCD detectors 16A, 16B, while the remainder of the light spectrum $\eta_{20B}-\eta_A\pm$ is reflected off the back of the bandpass means 14.

It should be appreciated that the bandpass means 14 may function as a filter wherein the bandpass means 14 transmits a small bandwidth of light while reflecting the remainder of the light spectrum. Alternatively, the bandpass means 14 may function as a mirror, wherein the bandpass means 14 reflects a small bandwidth of light while transmitting the remainder of the light spectrum. Preferably a mirrored dichroic filter is used.

The composite spectrum $\eta_S$ of light which reaches the focusing optics 17 comprises predetermined wavelengths around $\eta_A$ from the second path 20B and the remainder of the spectrum $\eta_{20A}-\eta_A\pm$ from the first path 20A. The composite spectrum $\eta_S$ passes through the focusing optics 17, through the filters 19A, 19B and onto the CCD linear array detectors 16A, 16B. Both filters 19A, 19B permit the respective detector 16A, 16B to detect non-overlapping bands of light.

Figure 2A:
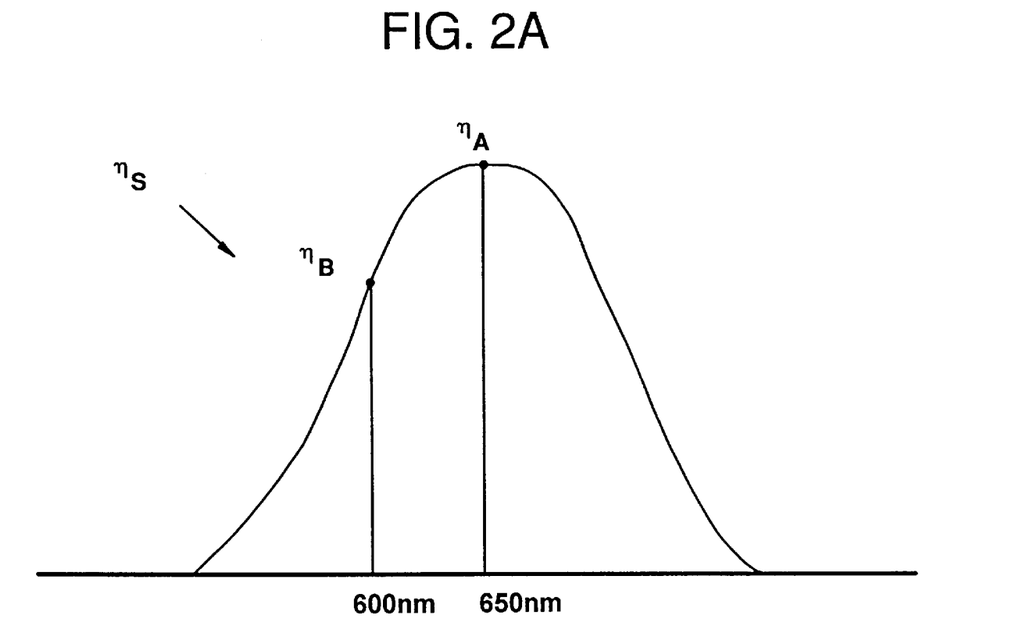
FIG. 2A is a diagram showing the spectrum of light.
Figure 2B:
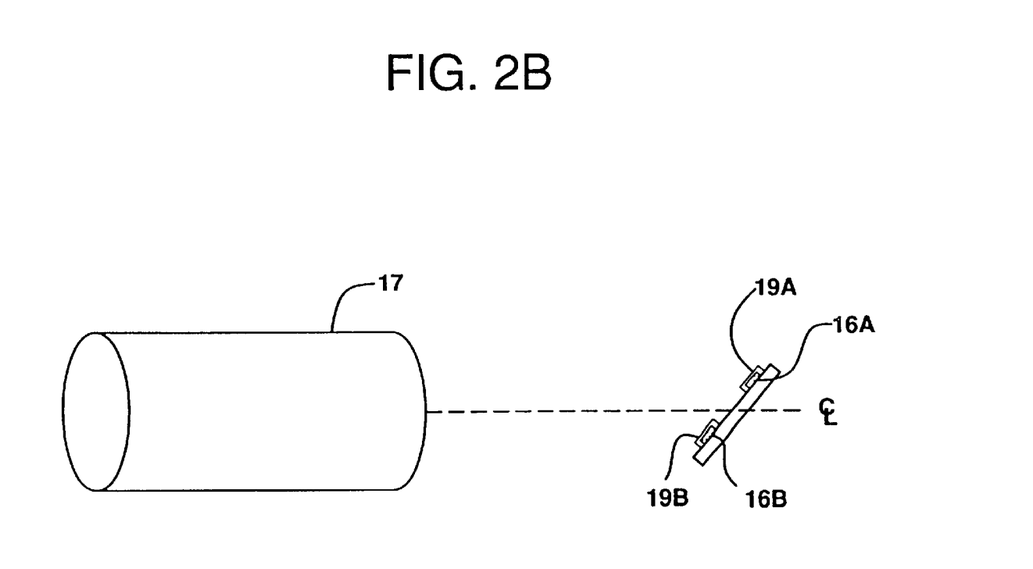
FIG. 2B is a more detailed diagram of the CCD detectors.

Referring to FIG. 2, the second CCD detector 16B is filtered to detect light having wavelengths around $\eta_A$. The first CCD detector 16A is filtered to permit the detection of light around a different wavelength $\eta_B$. For example, the bandpass means 14 may be calibrated to transmit light around the wavelength $\eta_A$ of 650 nm±. The second CCD detector 16B is filtered to detect light around the wavelength $\eta_A$ of 650 nm± originating from the second path 20B. The first CCD detector 16B is filtered to detect light around wavelength $\eta_B$ which originates from first path 20A, for example 600 nm±. Accordingly, the detectors 16A, 16B will detect two separate images of the bar code symbol 18.

Although the detectors 16A, 16B have been referred to as separate CCD linear sensors, preferably they comprise two of the three channels commonly found in a color CCD line scan sensor. In this embodiment, the color filters are preferably replaced with the appropriate notch filters 19A, 19B. Those of skill in the art should realize that the bandwidth transmitted by each notch filter 19A, 19B, including tolerances, should not overlap with the other notch filter 19A, 19B. Additionally, the notch filters 19A, 19B need not be of equal bandwidth. One notch filter 19A may have a narrow bandwidth of 590–610 nm±, and the other notch filter 19B may have a wide bandwidth of 625–675 nm±. Additionally, although two notch filters 19A, 19B may be employed, it is also possible to use one notch filter 19A, wherein the other filter 19B transmits all other wavelengths of light except for the bandwidth transmitted by the notch filter 19A. In all of these examples, the tolerances of the filters 19A, 19B should be kept in mind to avoid any overlap.

It should be apparent to those skilled in the art that the bandpass means 14 and the filters 19A, 19B over the CCD detectors 16A, 16B may be calibrated to detect any wavelength of light that is suitable for the desired application. The above values are illustrative only and should not be viewed as a limitation of the invention.

The light detected by the second CCD detector 16B comprises light from the second path 20B having wavelengths around $\eta_A$. The light detected by the first CCD detector 16A comprises light from the first path 20A having wavelengths around $\eta_B$. By definition, specular reflections only occur at a "critical angle". Once specular reflection occurs, this angle is defined and will be present only in one of the optical paths. Therefore, the other path will have useful information. If specular reflection "washes out" the view of the bar code symbol 18 at any point along the first path 20A, specular reflection will not be present in the second path 20B at the same point since the angle of the bar code symbol 18 with respect to the second path 20B is different than the angle with respect to the first path 20A.

Referring to FIG. 2B, since the lengths of the two paths 20A, 20B are different, the detectors 16A, 16B must be selectively placed to account for this difference. In FIG. 1, path 20A is shorter than path 20B. Preferably, the detectors 16A, 16B are mounted upon a common substrate which is rotated upon a center line CL to position the first detector 16A further from the focusing optics 17 than the second detector 16B.

Figure 3:
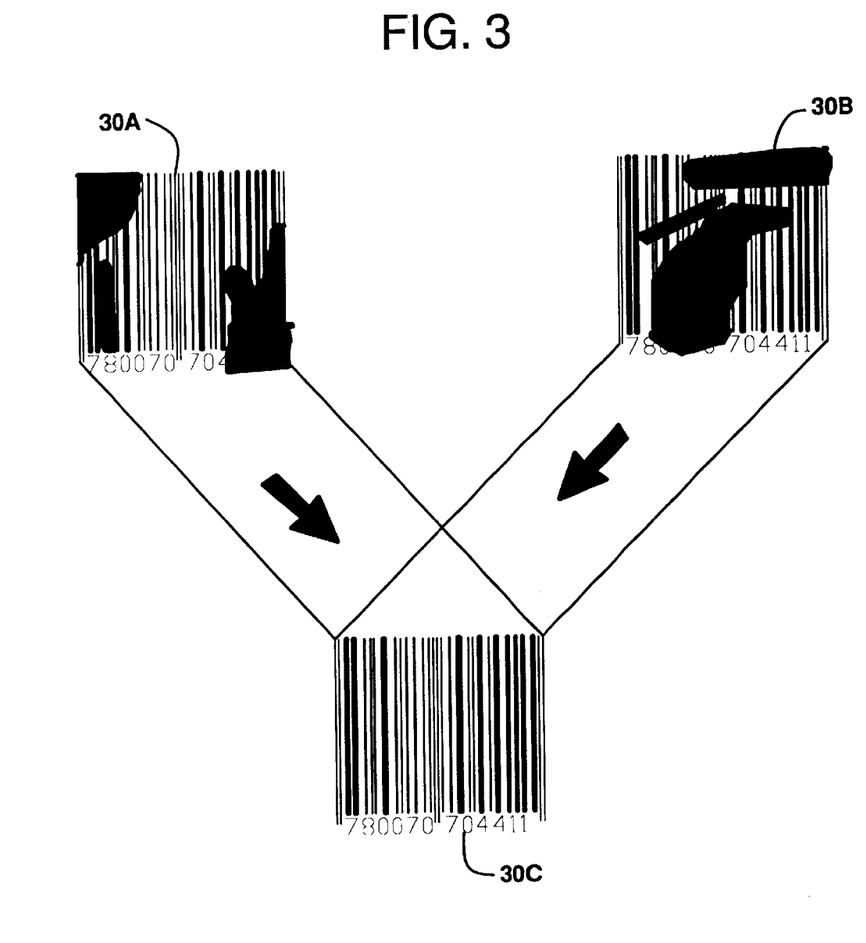
FIG. 3 illustrates the method of using valid information from two views and selectively combining the information.

Each of the CCD detectors 16A, 16B produces an electrical signal which corresponds to the detected light. Using the images 30A, 30B, 30C in FIG. 3 as a visual example of the reconstruction process, comparison of images 30A and 30B shows that image 30A has portions of specular reflection distortion, while image 30B also has portions of specular reflection distortion. However, the non-distorted areas of the images 30A, 30B can be used to form the complete image 30C. Although the images 30A, 30B, 30C are illustrated as area images, the preferred embodiment of the present invention detects and combines multiple line scans which make up the area images. It is clearly within the scope of the present invention to utilize detectors which detect either line or area scans.

Processing of the data from CCD detectors 16A, 16B to construct a complete bar code symbol 18 will be explained with reference to FIG. 4. The data from the CCD detectors 16A, 16B is output and analyzed by the logic unit 32. Depending upon the amount of specular reflection, data from one or both of the CCD detectors 16A, 16B may comprise a complete image of the bar code symbol 18. In that case, the complete image is used for further decoding in accordance with the specific type of symbology. If specular reflection is detected by the logic unit 32 in the data output from the first CCD detector 16A the logic unit 32 replaces the data with the data from the second CCD detector 16B.

Figure 4:
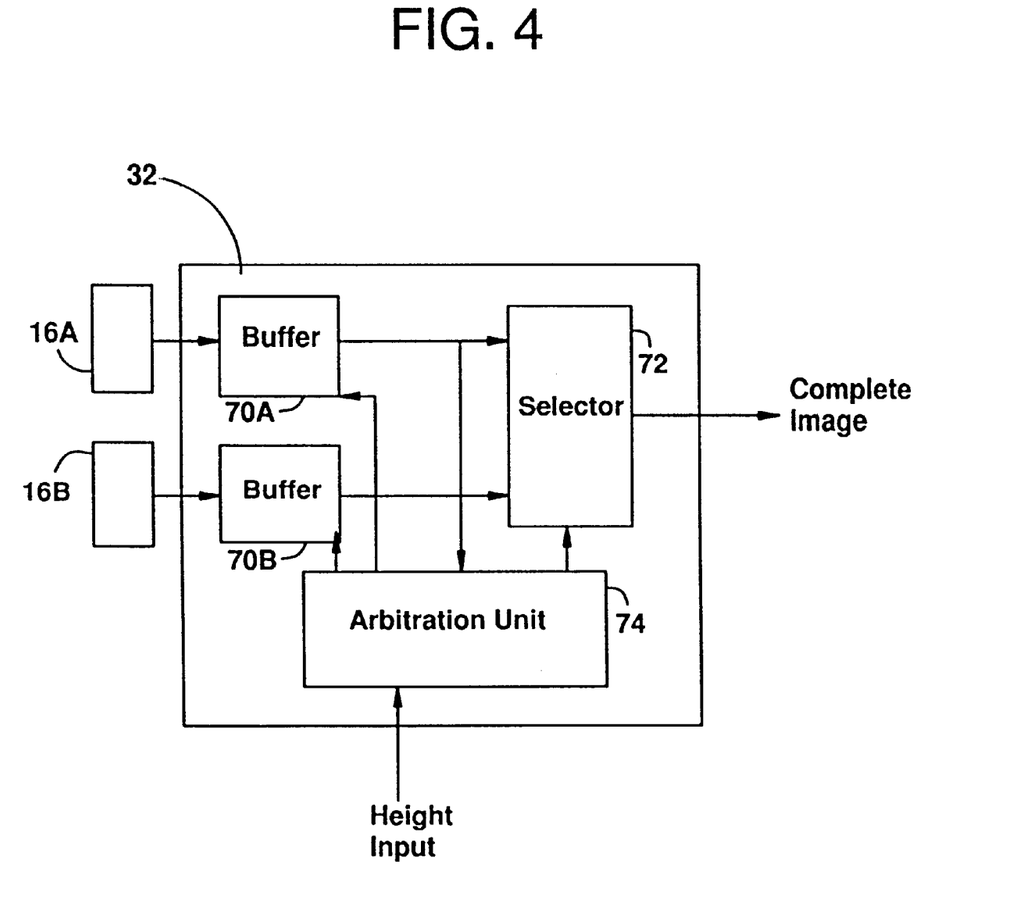
FIG. 4 is a block diagram of the coded symbology logic unit.

Referring to FIG. 4, the logic unit 32 comprises two buffers 70A, 70B, a selector 72 and an arbitration unit 74. The logic unit 32 receives the data, containing bar code information, from the CCD detectors 16A, 16B. The information coming from the CCD detectors 16A, 16B is selectively buffered depending upon the height of the package 8 upon which the bar code 18 is affixed. Referring back to FIG. 1, at a first height Y, the information is obtained simultaneously from both light paths 20A, 20B. Accordingly, no buffering of the data is required. However, when the package 8 to which the bar code 18 is affixed reaches height X, the bar code information from the second light path 20B will be obtained prior to the information from the first light path 20A. Therefore, information from the second light path 20B must be buffered by the buffer 70B prior to comparison with the information from the first light path 20A. Conversely, if the height of the package 8 to which the bar code 18 is affixed only reaches height Z, information from the first light path 20A will be detected prior to the information from the second light path 20B. In this event, the information from the first light path 20A will be buffered by buffer 70A. Each buffer 70A, 70B delays the information obtained from the respective light path 20A, 20B to synchronize the information with that obtained from the other light path 20B, 20A.

As discussed above, the delay is dependent upon the distance between the system 10 and the bar code symbol 18. The distance between the system 10 and a package 8 having the bar code symbol 18 located thereon may be obtained by using a light curtain 9, as in FIG. 1, or by any other means which is well known by those skilled in the art. From the height, or distance, the delay value may be calculated, or a look up table may be used. The delay value is then input into the desired buffer 70A, 70B.

After the signal output from either detector 16A, 16B has been buffered as necessary, the signals are compared by the arbitration unit 74. The signals comprise values which represent the intensity of light detected by the pixels of the CCD detectors 16A, 16B. If the CCD detectors 16A, 16B have eight-bit resolution, the number of gray scale levels will be 255 ($2^8-1$). Depending upon the application, it may be assumed that a valid signal will have a gray scale value between 0 and 240. If the gray scale value exceeds a predetermined threshold of 240, specular reflection is present. This threshold may be adjusted depending upon the particular application. In the preferred embodiment the arbitration unit 74 controls the selector 72 to select the output from the second CCD detector 16B when the value from the output from the first CCD detector 16A exceeds 240. In this manner, a complete image of the bar code symbol 18 is obtained.

The logic unit 32 forwards a complete digital image, corresponding to the information encoded in the bar code symbol 18, to an image processor 34 for decoding, storage or display, as is well known by those skilled in the art.

The scanning system 10 shown in FIG. 1 may be embodied in a mobile hand-held unit, or may be a stationary unit wherein an object carrying the bar code symbol 18 is passed under the light source 12 via a conveyor 7.

Figure 5:
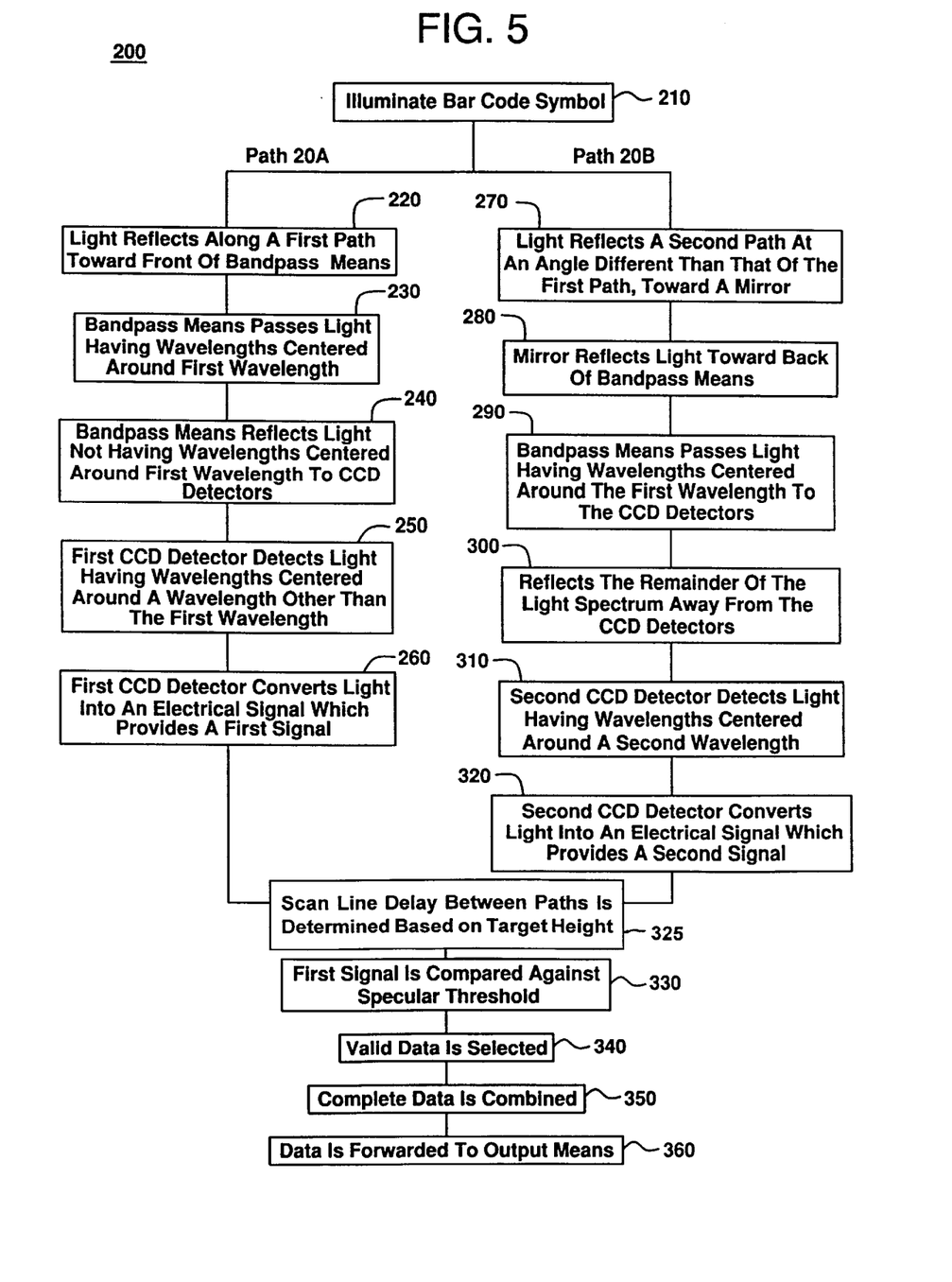
FIG. 5 is a flow diagram of the method of the present invention.

In operation, the scanning system 10 executes the bar code symbol reading and decoding procedure 200 shown in FIG. 5. The light source 12 illuminates a subject bar code symbol 18 (step 210). Light is reflected from the bar code symbol 18 along a first path 20A toward the front of the bandpass means 14 (step 220). The bandpass means 14 transmits light around a first predetermined wavelength $\eta_A$ (step 230) and reflects the remainder of the light spectrum $\eta_{20A}-\eta_A$ toward the CCD detectors 16A, 16B (step 240). The first CCD detector 16A detects light around a second predetermined wavelength $\eta_B$ from the first light path 20A. (step 250).

Simultaneously, light is reflected from the bar code symbol 18 along a second path 20B (step 270) toward the back of the bandpass means 14 (step 280). The bandpass means 14 passes light around the first predetermined wavelength $\eta_A$ to the CCD detectors 16A, 16B (step 290) and reflects the remainder of the light spectrum $\eta_{20B}-\eta_A$ away from the CCD detectors 16A, 16B (step 300). Light originating from the second path 20B comprises only light around the first predetermined wavelength $\eta_A$. Accordingly, it will be detected by the second CCD detector 16B (step 310).

The CCD detectors 16A, 16B convert the detected light into electrical signals which are output to the logic unit 32 (steps 260, 320). The delay, if any, between scan lines of the paths is then determined based on target height (step 325). The information from both light paths 20A, 20B is then synchronized. The logic unit 32 compares the signals (step 330) and the valid data is selected (step 340). This data is used to provide a complete bar code symbol 18. In the event that both signals comprise non-distorted data, the non-distorted data of either signal may be used. The logic unit 32 then arbitrates the data representing the complete bar code symbol 18 (step 350) and forwards the data to the output means 34 (step 350).

Figure 6:
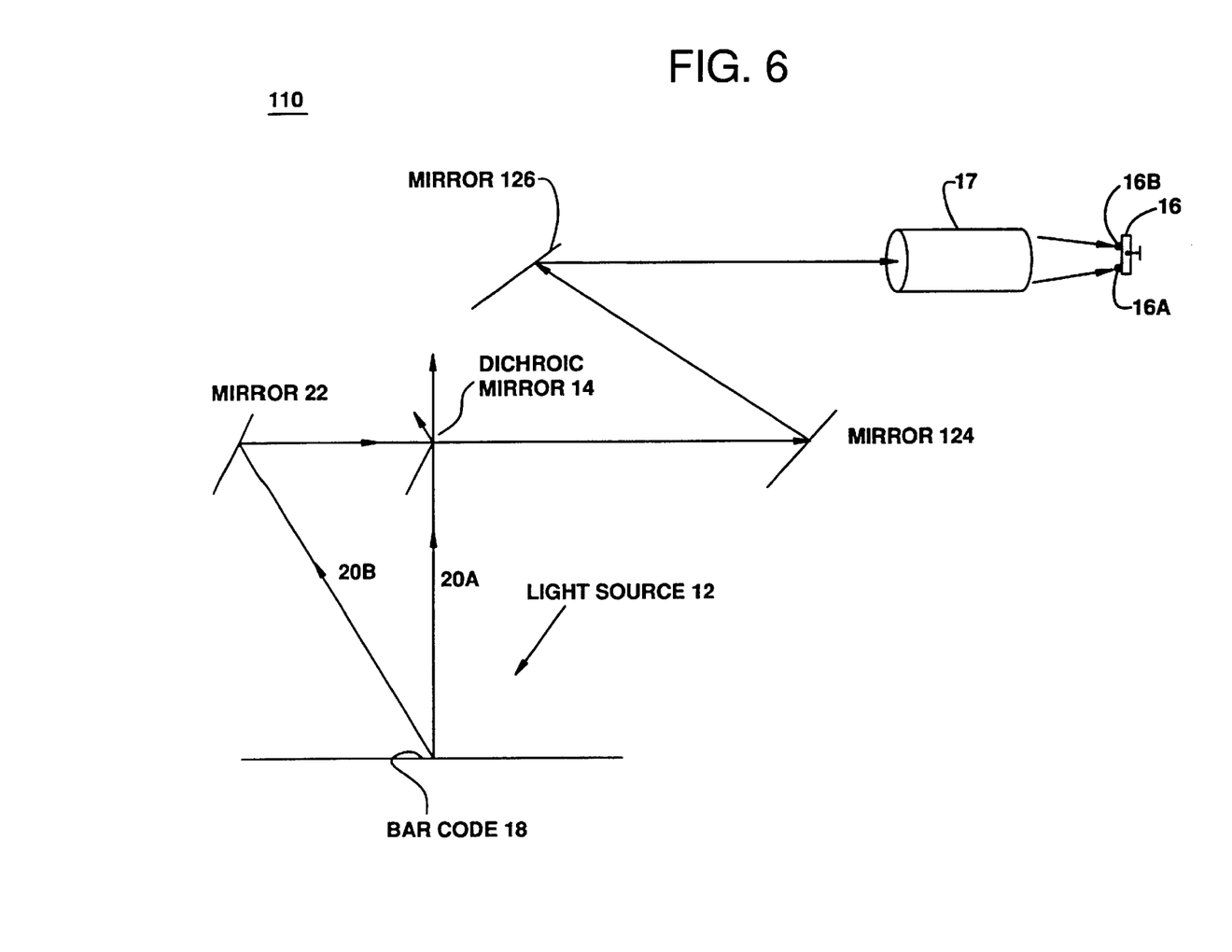
FIG. 6 is a first alternative embodiment of the present invention.

Referring to FIG. 6, an alternative embodiment of the scanning system 110 is shown in which additional mirrors 124, 126 are added to the system 110 to direct the paths of light along a modified route. The modified route permits alignment of the components in cases where manufacturing or other considerations require that the components be placed in a configuration other than that shown in FIG. 1.

Figure 7:
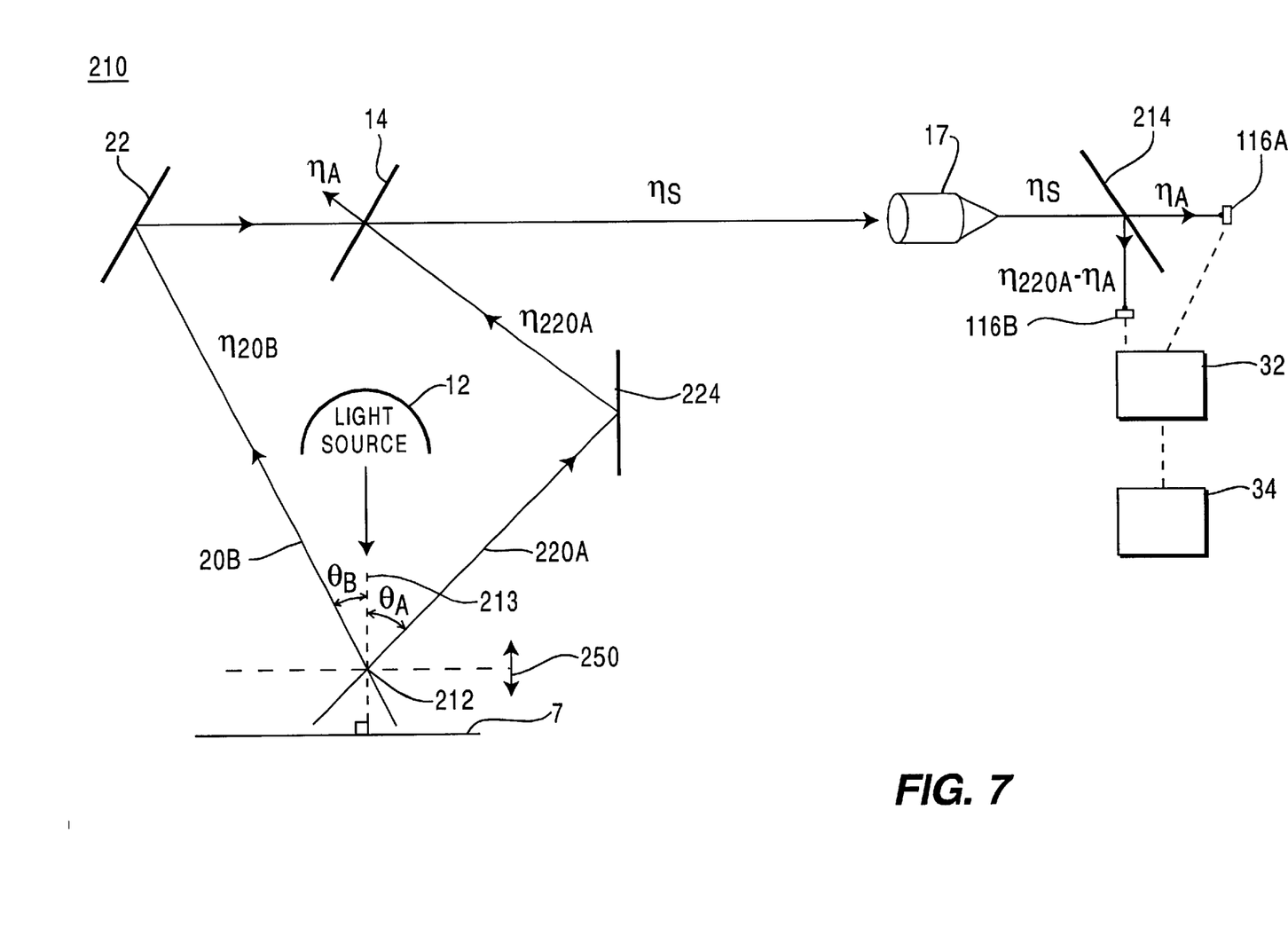
FIG. 7 is a second alternative embodiment of the present invention.

Referring to FIG. 7, a second alternative embodiment of the scanning system 210 is shown. In this embodiment the light source 12 is repositioned to be located over a package 8 or other object as was shown in the embodiment of FIG. 1. Placement of the light source 12 however, may be varied. Also, it can be appreciated by those reasonably skilled in the art that the light source may be comprised of several broadband light sources positioned at various locations in order to flood an object on the transport means 7. A mirror 224, which is preferably a planar mirror, is added and positioned such that light along a first path 220A strikes the mirror 224 and is reflected toward the front of the bandpass means 14. The first path 220A is defined as extending from the surface of the transport means 7 to the mirror 224 and then to the bandpass means 14. The bandpass means 14 permits light of predetermined wavelengths in a range surrounding $\eta_A$, striking either its front or rear surface, to pass through the bandpass means 14, and reflects the remainder of the light spectrum. The spectrum of light $\eta_{220A}$ traveling along the path of 220A strikes the front of the bandpass means 14. Light having wavelengths around $\eta_A$ passes through the bandpass means 14, while the remainder of the spectrum of light $\eta_{220A}-\eta_A$ is reflected toward optics 17. The spectrum of light $\eta_{20B}$ traveling along the second path 20B is reflected from the planar mirror 22 and strikes the back of the bandpass means 14. The second path 20B is defined as extending from the surface of the transport means 7 to the mirror 22 and then to the bandpass means 14. Light having wavelengths around $\eta_A$ passes through the bandpass means 14 toward the optics 17, while the remainder of the light spectrum $\eta_{20B}-\eta_A$ is reflected off of the back of the bandpass means 14. The composite spectrum $\eta_S$ of light which reaches the focusing optics 17 comprises predetermined wavelengths approximately at $\eta_A$ from the second path 20B and the remainder of the spectrum $\eta_{220A}-\eta_A$ from the first path 220A.

It should be recognized by those skilled in the art that FIG. 7 is illustrative only and is not drawn to scale. For example, the angle $\theta_A$ between the axis 213 and the first reflected path 220A is equal to the angle $\theta_B$ between the axis 213 and the second path 20B. Axis 213 is defined as being orthogonal to the surface of the transport means 7. It should be recognized by those skilled in the art that these angles $\theta_A$, $\theta_B$ may vary while remaining equal to each other depending upon the specific application and the mounting of the system 210 in relation to the transport means 7. Because $\theta_A=\theta_B$, the path lengths 220A, 20B originating from the intersection point 212, (or on a plane parallel to the transport means 7), to the bandpass means 14 are equal. Equalizing the path lengths 220A and 20B provides an advantage in that light traveling along both paths 220A,20B will have the same magnification and focus point at the detectors 116A, 116B.

This embodiment also shows an alternate detection scheme. Light traveling through the focusing optics 17 may be alternatively detected utilizing a pair of simple line detectors 116A, 116B and a second bandpass means 214. The use of this detection scheme eliminates the need for notch filters 19A, 19B as shown in the embodiment of FIG. 1. The second bandpass means 214 permits light of predetermined wavelengths in a range surrounding $\eta_A$, striking either its front or rear surface, to pass through the second bandpass means 214, and reflects the remainder of the light spectrum. It should be noted here that the second bandpass means 214 has the same transfer characteristics as bandpass means 14. Therefore, the composite spectrum $\eta_S$ consisting of predetermined wavelengths in a range surrounding $\eta_A$ from the second path 20B and the remainder of the spectrum $\eta_{220A}-\eta_A$ from the first path 220A may be separated once again through this second bandpass means 214. It should also be noted here that to achieve optimum wavelength separation, both bandpass means 14 and 214 should be formed of matched components having identical transfer characteristics. For example, it is preferred that the bandpass means 14, 214 be formed of a dichroic mirror or other suitable filter which has been coated and then separated into two components to ensure they have consistent bandpass properties or transfer characteristics.

The second bandpass means 214 will pass the predetermined wavelength $\eta_A$ to the detector 116A and reflect the remainder of the light spectrum consisting of $\eta_{220A}-\eta_A$ toward detector 116B to achieve the spectrum separation. It should be noted here that the bandpass means 14, 214 may be manufactured to pass any selected wavelength or group of wavelengths not necessarily contiguous in the spectrum with each other. For example, an optical "comb-type" filter may be utilized whereby selected wavelengths of light throughout the spectrum are permitted to pass, and other selected wavelengths are not permitted to pass. Accordingly, the bandpass means 14, 214 will reflect the remainder of the spectrum. As long as both bandpass means 14, 214 are manufactured from the same lot, the selected wavelengths to be passed versus the wavelengths to be reflected may be selected from a broad spectrum. However, it is preferred that the bandpass means 14, 214 have a transfer characteristic such that normalized photonic energy as seen by detectors 116A and 116B is equal. Therefore, the bandpass means 14, 214 should be designed to send approximately equal amounts of normalized photonic energy towards each detector 116A, 116B based upon the detector materials sensitivity to the received spectrum.

It should be appreciated that the second bandpass means 214 may function as a filter wherein the second bandpass means 214 transmits a bandwidth of light while reflecting the remainder of the light spectrum. Alternatively, the second bandpass means 214 may function as a mirror, wherein the second bandpass means 214 reflects a bandwidth of light while transmitting the remainder of the light spectrum. It should be noted here that bandpass means 14, 214 are therefore defined as a means for efficiently passing a selected bandwidth and for efficiently reflecting a different selected bandwidth. Preferably, both bandpass means 14, 214 should be of the same type and calibrated to each other. This can be achieved by producing them in the same lot as described above.

Although this alternate detection scheme has been shown as part of the alternative embodiment of FIG. 7, it should be understood by those reasonably skilled in the art that it is interchangeable with the detection scheme of FIG. 1. Therefore, either detection scheme may be utilized with any of the scanning system embodiments presented here.

An advantage of this system is that because the light paths 220A and 20B are of equal length, there is no need to selectively place detectors in an angular orientation as was shown in FIG. 2B to account for unequal path lengths.

An additional advantage of this embodiment is that it provides higher detection efficiency because of removal of notch filters 19A, 19B. Since the notch filters 19A, 19B of the first embodiment limit the detected spectrum to a narrow bandwidth, the photonic energy arriving at each detector 116A, 116B is therefore limited.

Removal of the notch filters 19A, 19B in this embodiment provides maximum efficiency in that the sum of the spectrum detected by detector 116A and the spectrum detected by detector 116B is substantially equal to the composite spectrum $\eta_S$. It can be appreciated however by those reasonably skilled in the art that some loss will occur at the bandpass means 214.

An additional advantage of this embodiment is that it may be utilized in scanning systems where there is a short working distance between the object and the bandpass means 14. It can be appreciated however that by utilizing an auto focus/zoom lens at the focusing optics 17 the working range 250 may be adjusted.

It should be understood that various additional components and configurations can be employed to alter the light paths and the intensity and precision of the light without departing from the spirit and scope of the invention. Although the invention has been described in part by making detailed reference to the preferred embodiment, such detail is intended to be instructive rather than restrictive. Similarly, although the preferred embodiment was described as detecting coded symbologies such as bar codes, the invention is not so limited and encompasses the imaging of other targets as well. It will be appreciated by those skilled in the art that many variations may be made in the structure and mode of operation without departing from the teachings herein.

What is claimed is:

1. A device for discriminating light intensities along different paths of reflected light in a scanner, the device comprising:
    a plurality of mirrors that receive and direct reflected light from an object along at least two paths which intersect each other at least once;
    a bandpass means positioned to intersect each of the paths;
    a detector that receives the light from the bandpass means; and
    a logic unit associated with the detector for discriminating light intensities from the respective paths.

2. The device of claim 1 wherein the bandpass means is positioned such that a first light path passes through a front surface and a second light path passes through a back surface.

3. The device of claim 2 wherein the bandpass means comprises a filter.

4. The device of claim 2 wherein the bandpass means is a mirrored dichroic filter.

5. The device of claim 3 wherein the bandpass means comprises a notch filter which transmits only a portion of a spectrum of light incident thereupon.

6. The device of claim 1 wherein the bandpass means transmits only a predetermined portion of the bandwidth of light incident thereupon and reflects all other light.

7. The device of claim 1 further comprising a light source positioned between two of the plurality of mirrors.

8. The device of claim 1 further comprising a focusing lens located between the detector and the bandpass means.

9. The device of claim 1 wherein the at least two paths have substantially equal lengths.

10. The device of claim 1 wherein the detector comprises:
    a first light sensor adapted to detect light around a first wavelength; and
    a second light sensor adapted to detect light around a second wavelength.

11. The device of claim 10 wherein the detector is positioned at an angle to light incident thereupon from the at least two paths.

12. The device of claim 10 wherein the detector further comprises:
    a second bandpass means positioned to receive light from the bandpass means.

13. The device of claim 12 wherein the first light sensor is positioned adjacent a front surface of the second bandpass means and the second light sensor is positioned adjacent a back surface of the second bandpass means.

14. In a scanner for scanning a coded symbology, a device for discriminating light intensity between at least two paths of reflected light in the scanner, the device comprising:
    a bandpass means having a front and back surface,
    a first mirror that reflects light toward the bandpass means front surface along a first light path,
    a second mirror that reflects light toward the bandpass means back surface along a second light path, and
    a detector for detecting and discriminating between light from the first and second light paths.

15. The device of claim 14 further comprising a logic unit for sensing and discriminating between light along the first and second light paths.

16. The device of claim 14 wherein the first light path and second light path have substantially equal lengths.

17. The device of claim 14 wherein the bandpass means comprises a filter.

18. The device of claim 14 wherein the bandpass means is a mirrored dichroic filter.

19. The device of claim 14 wherein the bandpass means transmits only a predetermined portion of the bandwidth of light incident upon it and reflects all other light.

20. The device of claim 14 wherein the detector further comprises a first light sensor to detect a portion of a spectrum of light from the first light path and a second light sensor to detect a portion of a spectrum of light from the second light path.

21. The device of claim 20 wherein the bandpass means passes only a predetermined band of wavelengths from the first light path to the first sensor.

22. The device of claim 21 wherein the bandpass means passes the predetermined band of wavelengths from the light of the second path and reflects all other wavelengths toward the second sensor.

23. A method for scanning coded symbologies comprising:
    illuminating a selected scan location;
    detecting light reflected from an object along first and second light paths wherein the paths are of equal length; and
    discriminating between light along the first and second paths based on an evaluation of their relative intensities.

* * * * *